March 1, 1949.   J. J. SLOMER   2,463,325
HYDRAULIC BRAKING SYSTEM
Filed April 19, 1946

Inventor
Joseph J. Slomer
Clarence T. Poole
Attorney

Patented Mar. 1, 1949

2,463,325

UNITED STATES PATENT OFFICE 2,463,325

HYDRAULIC BRAKING SYSTEM

Joseph J. Slomer, Chicago, Ill., assignor to Goodman Manufacturing Company, Chicago, Ill., a corporation of Illinois Application April 19, 1946, Serial No. 663,558

6 Claims. (Cl. 188—153)

This invention relates to improvements in hydraulic braking systems particularly adapted to control the braking of mine locomotives connected to operate together.

Hydraulic braking systems have heretofore been provided for controlling the braking of two locomotives connected together to operate in tandem, which have been so arranged that the control valve on one locomotive may operate the brakes on the two locomotives. In order, however, that the brakes may be operated from either locomotive when operating separately or in tandem, a manually controllable valve means has been provided in the connection between the locomotives, which must be operated each time the operator changes his position from one locomotive to the other, to prevent the hydraulic fluid from passing through the control valve on one locomotive back to the supply tank for hydraulic fluid, upon the operation of the control valve of the other locomotive, and thus unload the fluid pressure system. Since the operator changes his position from one locomotive to the other at each end of each trip of the locomotive, this operation takes an undue amount of time from the running time of the locomotive and becomes an onerous job for the locomotive operator.

The principal objects of my invention are to remedy these difficulties by providing a new and improved braking system for operating from either locomotive the brakes of two mine locomotives connected in tandem, which utilizes a novel form of valve means, operable without the attention of the operator of the locomotive, for switching the braking connections from one locomotive to the other, by the operation of one or the other brake control valves.

A more specific object of my invention is to provide a hydraulic braking system for a plurality of locomotives operable separately or in tandem, which includes a source of fluid pressure in each locomotive, with a control valve in each locomotive for controlling operation of the braking means of the two locomotives and valve means in each locomotive, in the fluid connections between the two locomotives, so arranged as to prevent the passage of fluid through the control valve and source of fluid pressure of one locomotive when the control valve on the other locomotive is operating the brakes on the two locomotives.

These and other objects of my invention will appear from time to time as the following specification proceeds and with reference to the accompanying drawings wherein.

Figure 2:
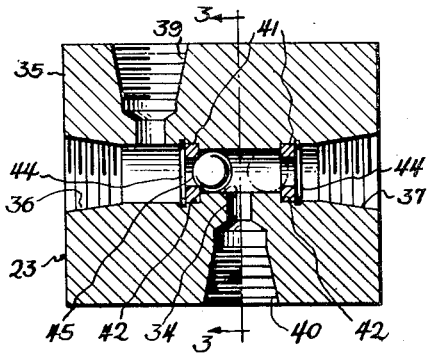
Figure 2 is a horizontal sectional view taken through a shuttle valve constructed in accordance with my invention.
Figure 3:
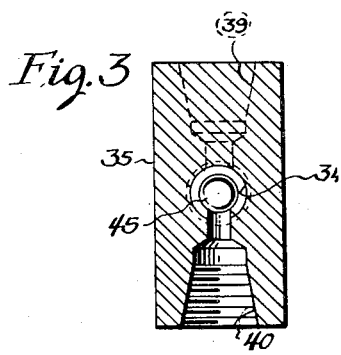
Figure 3 is a transverse sectional view taken substantially along line 3—3 of Figure 2.
Figure 1:
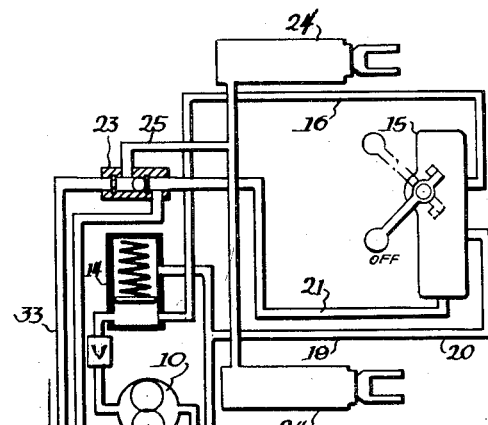
Figure 1 shows a fluid diagram for a hydraulic braking system for two locomotives connected to operate in tandem and illustrating one form in which my invention may be embodied.
Figure 1:
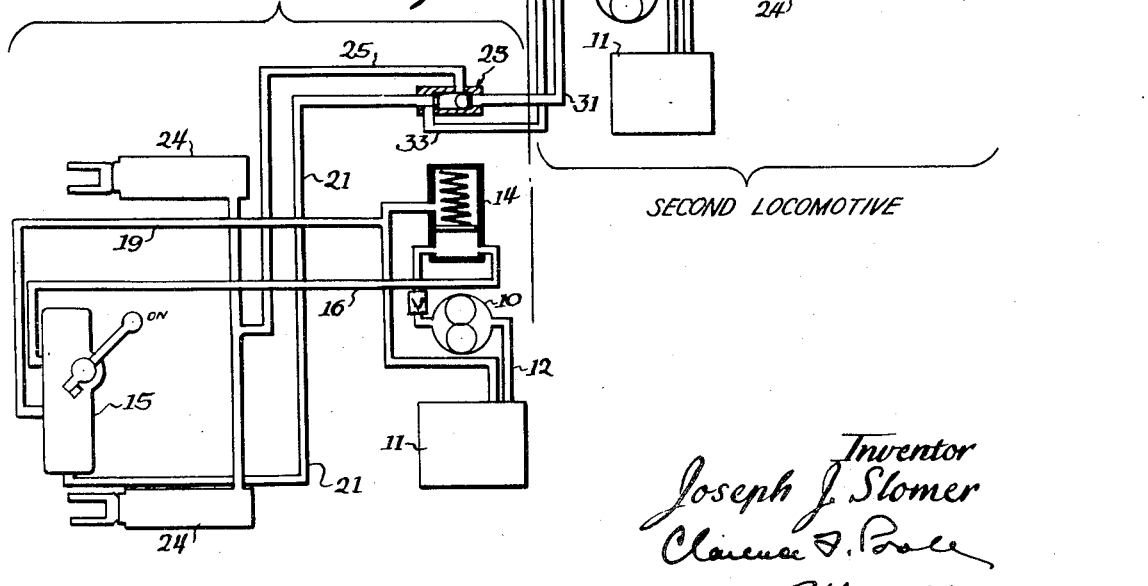

Referring now to Figure 1 of the drawings illustrating a hydraulic braking system for two mine locomotives connected to operate in tandem, a separate braking system is provided for each locomotive so the locomotives may be operated separately when uncoupled, if desired. Said braking systems are of the same construction, so one only will herein be described in detail and the same part numbers will be given to each system for each locomotive. Each braking system includes a fluid pump 10 which is supplied with fluid from a fluid storage tank 11 through a pipe 12. The pump 10 supplies fluid under pressure to an accumulator 14 of a well known form commonly used in hydraulic systems, which accumulates pressure to operate the brakes when power to the locomotive is turned off and said pump is not in operation. From said accumulator fluid under pressure is conducted to a brake control valve 15 through a pipe 16. Said control valve may be of any well known form of variable pressure control valve, for supplying pressure at increasing pressures as the control handle therefor is turned to an on position, and is no part of my present invention so is not herein shown or described in detail. Fluid is returned from the braking means through said control valve to the tank 11, upon release of the brakes, by means of a return pipe 19. A pipe 21 leads from said control valve 15 to a reversing or shuttle valve 23. Said shuttle valve is connected with a braking means herein shown as being two hydraulic brake operating cylinders 24, 24, by means of a pipe 25. A pipe 31 connects an end of the shuttle valve 23 opposite from the pipe 21 to an end of the shuttle valve 23 for the second locomotive, adjacent the point of connection of the pipe 25 to said shuttle valve for said second locomotive. In a like manner a pipe 33 is connected from the end of the shuttle valve 23 for the first locomotive, adjacent its point of connection to the pipe 21, to the end of the shuttle valve 23 for the second locomotive, which is opposite from the pipe 21 on said second locomotive. Said pipes are thus so arranged as to reverse the direction of the flow of fluid to the shuttle valves 23, 23 upon operation of one or the other control valve 15, so either pipe may supply pressure for operating the brakes of the other locomotive, depending upon which control valve 15 is being operated by the locomotive operator.

Each shuttle valve 23 includes a valve chamber 34 extending longitudinally through a valve block 35. An inlet opening 36 is provided to one end of said valve block and is herein shown as being in alignment with the chamber 34. Said inlet opening for each shuttle valve is adapted to have one of the pipes 21 connected thereto. An inlet opening 37 is provided in the opposite end of said valve block and is also in alignment with the valve chamber 34. Said inlet opening of said shuttle valve for the first locomotive is adapted to have the pipe 31 connected thereto. Said inlet opening of the shuttle valve for the second locomotive is adapted to have the pipe 33 connected thereto. An outlet opening 39 is provided in said valve block of each shuttle valve. Said outlet opening of the shuttle valve for the first locomotive communicates with the inlet opening 36 of the shuttle valve for the second locomotive for supplying fluid under pressure to the shuttle valve 23 on the second locomotive through the pipe 33. Said outlet opening 36 of the shuttle valve for the second locomotive communicates with the pipe 31, for supplying fluid under pressure to the shuttle valve for the first locomotive. A pressure outlet 40 leads from said valve block and is adapted to have the pressure pipe 25 connected thereto for supplying fluid under pressure to the braking cylinders 24, 24. Said pressure outlet has communication with an intermediate portion of the valve chamber 34 between two longitudinally spaced valve seats 41, 41. Said valve seats are mounted in said chamber adjacent opposite ends thereof, and are herein shown as abutting shouldered ends 42, 42 of said valve chamber and as being held in position in said valve chamber in abutting relation with respect to said shouldered ends by means of snap rings 44, 44.

A ball 45 is mounted within the valve chamber 34 for movement therealong and is adapted to seat itself against either one of the valve seats 41, 41, to prevent fluid under pressure from passing out of the opening 37 when entering said valve chamber through the opening 36, and to prevent fluid under pressure from passing through the openings 36 and 39 when passing into said valve block through the opening 37, but to permit fluid under pressure to leave said valve block through the pressure outlet 40, for operating the brakes when pressure enters said valve through either pressure opening 37 or 39, depending upon which control valve 15 is being operated.

When the control valve 15 on one locomotive, hereinafter called the first locomotive, is in an on position as shown in Figure 1, fluid under pressure will pass through the pipe 21 to the shuttle valve 23 through the inlet opening 36. This will cause the ball 45 to seat against the seat 41 adjacent the inlet opening 37 and prevent the passage of fluid under pressure through the pipe 31 leading to the shuttle valve 23 in the second locomotive. Fluid under pressure will also pass through the pressure outlet 40 and pipe 25 to the brake cylinders 24, 24 of the first locomotive, to operate said brake cylinders. At the same time fluid pressure will pass through the pipe 33 to the shuttle valve 23 of the second locomotive to simultaneously move the ball of said valve into position to prevent the passing of fluid through the pipe 21 to and through the control valve 15 of said locomotive, and thus prevent release of pressure from the braking system of the two locomotives by passing back into the tank 11 for said second locomotive through said control valve on said second locomotive. Fluid under pressure will also pass from the shuttle valve 23 of the second locomotive to the brake operating cylinders 24, 24 to operate the brakes of the second locomotive simultaneously with operation of the brakes of the first locomotive.

In a like manner, upon operation of the control valve 15 of the second locomotive, the pipe 33 leading from the shuttle valve 23 of the second locomotive to the shuttle valve 23 of the first locomotive will be closed, which will prevent fluid from passing through the control valve 15 for the first locomotive back to the tank 11 and unloading the braking system. Fluid will then pass through the pipe 31 to the shuttle valve 23 of the first locomotive to operate the braking cylinders of said first locomotive simultaneously with operation of the braking cylinders of said second locomotive.

It should here be noted that when the control valve 15 on the first locomotive is operated, the brake cylinders 24, 24 of the two locomotives are operated by fluid pressure supplied by the pump 10 on the first locomotive, and that when said control valve is turned off to release the brakes, fluid will be returned from the brake cylinders of the second locomotive to the fluid storage tank 11 on the first locomotive through the pipe 33, valve 23, pipe 21, control valve 15 of the first locomotive, and the return pipe 19. Also when the control valve 15 on the second locomotive is operated to apply the brakes on both locomotives, the pump 10 on the second locomotive supplies fluid for operating the brake cylinders on the two locomotives, and upon turning of said control valve on said second locomotive to an off position, fluid is returned to the tank 11 on the second locomotive from the brake cylinder on the first locomotive, through the pipes 31 and 21, valve 15 and pipe 19.

Thus only one source of supply for fluid under pressure is used to operate the brakes on the two locomotives and this source of supply is the one directly connected with its associated control valve, and when the brakes are released, fluid is returned to this same source of supply from the brake cylinders of the two locomotives. This permits the other source of supply to be at full pressure ready to supply full pressure to the locomotive brakes when its control valve is operated to supply fluid under pressure to operate the brakes of the two locomotives.

It may further be seen that a simplified valve system has been provided with reversing pipe connections between the shuttle valves on each locomotive, for reversing the direction of the flow of fluid between said valves, which valve system is so arranged as to automatically reverse the flow of fluid through said valves to permit the operation of the brakes for the two locomotives from one brake control valve and source of pressure from one locomotive, without the attention of the locomotive operator.

It should here be noted that while I have shown the fluid pressure system operable to apply the brakes of mine locomotives operable separately or in tandem, that it may also be used to perform other hydraulic operations on the locomotives from either one locomotive or the other, if desired.

While I have herein shown and described one form in which my invention may be embodied, it will be understood that the construction thereof and the arrangement of the various parts may be altered without departing from the spirit and scope thereof. Furthermore, I do not wish to be construed as limiting my invention to the specific embodiment illustrated, excepting as it may be limited in the appended claims.

I claim as my invention:

1. In a fluid pressure system particularly adapted to control braking of a plurality of locomotives connected to operate separately or in tandem, a fluid storage tank and pump on each locomotive, a control valve on each locomotive, a brake cylinder on each locomotive and a fluid connection between each control valve and its respective brake cylinder, for operating said brake cylinder, an automatically operable shuttle valve on each locomotive, and fluid connections connecting said shuttle valves together, said shuttle valves being movable into position upon operation of one control valve, to block the passage of fluid to said other control valve and to connect said one control valve with the pump on the locomotive on which said one control valve is located, to make possible the operation of said brake cylinders on each locomotive by means of either control valve when the other control valve is in an off position, without changing the connections from said control valves to said brake cylinders on the two locomotives.

2. In a fluid pressure system particularly adapted to control braking of a plurality of locomotives connected to operate separately or in tandem, a fluid storage tank and pump on each locomotive, a control valve on each locomotive, a brake cylinder on each locomotive and a fluid connection between said control valve and brake cylinder, for operating said brake cylinder including a shuttle valve on each locomotive, a fluid connection from each control valve to each shuttle valve, a fluid connection from each shuttle valve to an associated brake cylinder, and reversing fluid connections between said shuttle valves on said two locomotives, to reverse the flow of fluid under pressure from one end of one shuttle valve to the other end of said valve depending upon which control valve is in operation, to operate one of said shuttle valves to block the flow of fluid under pressure to the control valve not in operation, and each of said shuttle valves supplying fluid under pressure to its associated braking means upon the operation of either control valve.

3. In a fluid pressure system particularly adapted to control braking of a plurality of locomotives connected to operate separately or in tandem, a fluid storage tank and pump on each locomotive, a control valve on each locomotive, a brake cylinder on each locomotive, and a fluid connection between said control valve and brake cylinder including a shuttle valve on each locomotive, a separate fluid connection connecting each control valve to each shuttle valve, a fluid connection from each shuttle valve to an associated brake cylinder, a fluid connection from one shuttle valve, adjacent the point of connection of said fluid connection from said control valve to said one shuttle valve, to the end of the other shuttle valve opposite from the point of connection of its fluid connection from its control valve to said shuttle valve, a fluid connection from the end of said one shuttle valve which is opposite the point of connection of said fluid connection from its control valve thereto, to the end of said other shuttle valve adjacent the point of connection of its fluid connection from its control valve to said shuttle valve, and a valve element in said shuttle valve operated by fluid under pressure entering either end thereof, for blocking the passage of fluid through the end of the shuttle valve on the other locomotive adjacent the point of connection of its control valve thereto, to prevent the passage of fluid to the control valve of the other locomotive upon operation of the control valve of said one locomotive, and said valve element of said shuttle valve on said one locomotive moving to a position to block the passage of fluid to the fluid connection connected therewith when fluid under pressure enters said shuttle valve from said shuttle valve on said other locomotive, upon operation of said control valve on said other locomotive, and said fluid connections from said shuttle valves to said associated brake cylinders being so arranged as to supply fluid under pressure to the associated brake cylinders upon operation of either brake control valve.

4. In a fluid pressure system particularly adapted to control braking of a plurality of locomotives connected to operate separately or in tandem, a braking system for each locomotive including a fluid storage tank and pump, fluid pressure braking means, a control valve for controlling the operation of said braking means, a shuttle valve, a fluid connection from each control valve to said shuttle valve, a fluid connection from said shuttle valve to said braking means for supplying fluid under pressure thereto, and fluid connections from one shuttle valve on one locomotive to the other shuttle valve on the other locomotive, and said shuttle valves being automatically operable upon operation of one brake control valve to supply fluid under pressure to both braking means from one fluid pump and motor on one locomotive and to prevent the unloading of fluid under pressure from said braking means through the other brake control valve.

5. In a fluid pressure system particularly adapted to control braking of a plurality of locomotives connected to operate separately or in tandem, a braking system for each locomotive including a fluid storage tank and pump, fluid pressure braking means, a control valve for controlling the operation of said braking means, an automatically operable shuttle valve operated by fluid under pressure on either end thereof to block the passage of fluid from the opposite end thereof, a fluid connection from said shuttle valve to said braking means to admit fluid under pressure to said braking means when fluid enters either end of said valve, a fluid connection from said control valve to one end of said shuttle valve, a fluid connection from the shuttle valve on the other locomotive to the opposite end of said first mentioned shuttle valve, arranged to supply fluid under pressure thereto upon operation of the control valve on the other locomotive and to operate said first mentioned shuttle valve to block the passage of fluid to the control valve on the one locomotive having said first mentioned shuttle valve associated therewith, to prevent the discharge of fluid through said control valve on said one locomotive when turned to an off position and said control valve on said other locomotive is in operation.

6. In a fluid pressure system particularly adapted to control braking of a plurality of locomotives connected to operate separately or in tandem, a braking system for each locomotive including a fluid storage tank and pump, fluid pressure braking means, a control valve for controlling the operation of said braking means, an automatically operable shuttle valve operated by fluid under pressure on either end thereof to block the passage of fluid from the opposite end thereof, a fluid connection from said shuttle valve to said braking means to admit fluid under pressure to said braking means when fluid enters either end of said valve, a fluid connection from said control valve to one end of said shuttle valve, a fluid connection from the shuttle valve on the other locomotive to the opposite end of said first mentioned shuttle valve, arranged to supply fluid under pressure thereto upon operation of the control valve on the other locomotive and to operate said first mentioned shuttle valve to block the passage of fluid to the control valve on the one locomotive having said first mentioned shuttle valve associated therewith, to prevent the discharge of fluid through said control valve on said one locomotive when turned to an off position and said control valve on said other locomotive is in operation, and a connection from said shuttle valve on said one locomotive to the end of said shuttle valve on said other locomotive opposite from the point of connection of its control valve thereto, to supply fluid under pressure thereto upon operation of said control valve on said one locomotive and to move said second mentioned shuttle valve to a position to block the passage of fluid to the return through said control valve on said other locomotive.

JOSEPH J. SLOMER.

No references cited.